United States Patent [19]

Yoshizawa et al.

[11] Patent Number: 5,064,985
[45] Date of Patent: Nov. 12, 1991

[54] METHOD FOR CONTROLLING WITHDRAWAL OF ELECTRODE IN ELECTRIC-DISCHARGE MACHINE

[75] Inventors: Hideyoshi Yoshizawa, Kawasaki; Takashi Ishii, Ebina; Toshiyuki Makino, Kawasaki; Hidekatsu Ozawa; Yasuyuki Shimizu, both of Ebina, all of Japan

[73] Assignee: Hitachi Seiko, Ltd., Tokyo, Japan

[21] Appl. No.: 459,166

[22] Filed: Dec. 29, 1989

[51] Int. Cl.[5] .......................... B23H 1/00; B23H 7/18; B23H 7/20
[52] U.S. Cl. ................................... 219/69.16
[58] Field of Search ................. 219/69.13, 69.19, 69.2, 219/69.16, 69.17; 364/474.04

[56] References Cited

U.S. PATENT DOCUMENTS

| 4,135,070 | 1/1979 | Pfau et al. | 219/69.2 |
| 4,608,476 | 8/1986 | Shimizu | 219/69.17 |
| 4,733,040 | 3/1988 | Pelloni et al. | 219/69.17 |
| 4,891,487 | 1/1990 | Nakata | 219/69.17 |
| 4,939,334 | 7/1990 | Gruber et al. | 219/69.12 |

FOREIGN PATENT DOCUMENTS

| 51-73697 | 6/1976 | Japan . | |
| 53-6999 | 1/1978 | Japan . | |
| 206313 | 12/1983 | Japan | 219/69.13 |

Primary Examiner—Geoffrey S. Evans
Attorney, Agent, or Firm—Sixbey, Friedman, Leedom & Ferguson

[57] ABSTRACT

The method for controlling the withdrawal of the electrode in an NC electric-discharge machine permits a linear withdrawal of the electrode to a forward position at least two blocks preceding the present forward position from the workpiece according to a withdrawal command received by the NC unit and with a high efficiency while a workpiece is being machined with electric discharges made between the electrode and the workpiece with the former being forwarded in relation to the latter according to a control information including positioning commands given to the NC unit for each block.

4 Claims, 5 Drawing Sheets

| Table No. | Forward position FWD(T) | Backward position BCK(T) |
|---|---|---|
| 1 | a2 | a1 |
| 2 | a3 | a2 |
| 3 | a4 —*1→ a2 | a3 —*2→ a2 |
| 4 | a4 | a2 |

| Table No. | Forward position FWD(T) | Backward position BCK(T) |
|---|---|---|
| 1 | b2 | b1 |
| 2 | b3 | b2 |
| 3 | b4 | b3 —*3→ b2 |
| 4 | b5 | b4 —*3→ b2 |
| ⋮ | ⋮ | ⋮ |
| n−1 | bn | b(n−1) —*3→ b2 |
| n | — | — |

METHOD FOR CONTROLLING WITHDRAWAL OF ELECTRODE IN ELECTRIC-DISCHARGE MACHINE

BACKGROUND OF THE INVENTION a) Field of the Invention

The present invention relates to a method for controlling a numerically-controlled (NC) electric-discharge machine which machines a workpiece with electric-discharge by forwarding the electrode in relation to the workpiece according to control information including positioning commands given to the NC unit for each block, and more particularly to a method for controlling the withdrawal of the electrode in an NC electric-discharge machine, in which the electrode is withdrawn in relation to the workpiece according to a withdrawal command supplied to the NC unit during an electric-discharge machining.

b) Description of the Prior Art

The NC electric-discharge machining is a metal-removing process in which an NC unit is used to control an electric-discharge machine by which a workpiece is machined with cumulative multiple pit marks or craters created (as the result of the workpiece material removal) by generating pulsed discharges in the spark gap between the electrode and workpiece with pulsed voltages applied between the electrode and workpiece.

In such NC electric-discharge machine, when any abnormality, typically an inter-pole short-circuit, takes place between the poles (electrode and workpiece) in the course of an electric-discharge machining, it is necessary to stop the machining and remove metal particles staying between the poles and which cause the short-circuit. The control over the withdrawal of the electrode (in an opposite direction to the forwarding of the electrode) is known as disclosed in, for example, the U.S. Pat. No. 3,975,608.

The electrode-withdrawal control of this kind is called a retracing control in which when a withdrawal command is received from the inter-pole abnormality detector, the electrode is withdrawn as retraced precisely along the forwarding route of the electrode.

This will be further explained with reference to FIG. 1 showing the prior-art electrode withdrawal control in electric-discharge machining. In FIG. 1, the reference numeral 1 denotes an electrode and 2 a workpiece. For machining the workpiece 2 into the illustrated form with its material removed by the electrode 1 having the illustrated shape, it is assumed that the positioning commands included in the control information recorded in the NC tape correspond to the points a1, a2, a3 and a4 as shown in FIG. 2. Also it is assumed that a withdrawal command is received when the electrode 1 has come to a point a5 just before the point a4. In this situation, the electrode 1 will go back along the route from the point a5 through the points a3 and a2 to the point a1 in the conventional electrode-withdrawal control. It will be obvious, however, that the electrode 1 has to go over a long distance and takes a long time for this withdrawal.

FIG. 3 also shows an electrode withdrawal in an example electric-discharge machining. In this example, the electrode 1 of the illustrated shape is used to machine the workpiece 2 into the form shown under the positioning commands in the control information recorded in the NC tape. For a machining of the workpiece of which the surface roughness is to be small, for example, in this case, it is assumed that the electrode 1 is forwarded along a route from the point b1 through the points b2, b3, b4, . . . , b(n−1) to the point bn. Namely, the electrode forwarding route has a succession of many small segments of a same direction, especially, in a section extending from the point b2 to bn. When a withdrawal command is received at the point bn, the electrode 1 will go back along the route from the point bn through the points b(n−1), . . . , b4, b3 and the point b2 to the point b1. The electrode 1 takes a long time for withdrawal, especially, from the point bn to b2.

A technique associated with this electrode-retracing control is disclosed in the Japanese Unexamined Patent Publication Nos. 51-73697 and 53-6999.

In this technique, when a withdrawal command is received, the electrode 1 is withdrawn reversely following its forwarding route. Therefore, the electrode 1 has to go back over a long distance and takes a long time for the withdrawal. Namely, the efficiency of electrode withdrawal is low and also the efficiency of metal-particle removal is low.

Note that the points designated with the designating commands, that is, each of the points a1 to a4 and b1 to bn will be referred to as "forward position" herein and that the line mutually connecting the neighboring forward positions will be called "segment" herein. Also it should be noted that the machining start-side point (block start position) of each segment will be called "beginning of segment" while the machining end-side point (block forward position) is called "end of segment".

SUMMARY OF THE INVENTION

The present invention has an object to overcome the above-mentione drawbacks of the conventional electrode withdrawal control technique by providing a method for controlling the withdrawal of the electrode in electric-discharge machine, in which the electrode can be withdrawn with a high efficiency.

The above-mentioned object is attained by providing a method for controlling the withdrawal of the electrode in an NC electric-discharge machine, in which when the NC unit receives a withdrawal command while a workpiece is being machined with electric discharges made between the electrode and the workpiece with the former being forwarded in relation to the latter according to a control information including positioning commands given to the NC unit for each block, the electrode is withdrawn linearly to a forward position preceding at least two blocks the present forward position from the workpiece according to the withdrawal command and with a high efficiency.

These and other objects and advantages of the present invention will be better understood from the ensuing description made by way of example of the embodiments of the present invention with reference to the drawings.

DETAILED DESCRIPTION OF THE PREFERRED EMBODIMENTS

Figure 5:
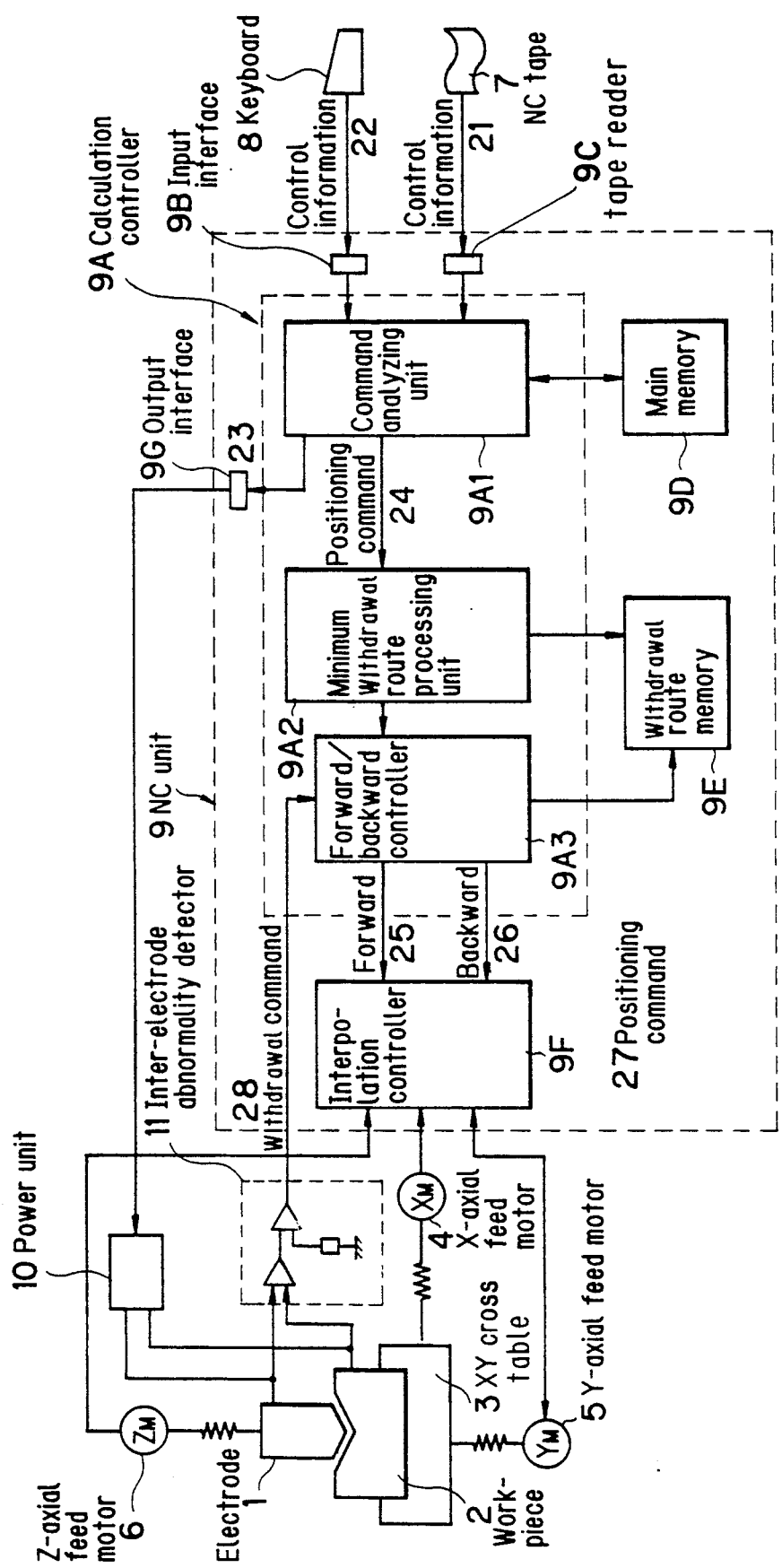
FIG. 5 is a block diagram showing one embodiment of the NC electric-discharge machine to which the method for controlling the withdrawal of electrode according to the present invention is applied.

Referring now to Figures, the embodiments of the method for controlling the withdrawal of electrode according to the present invention will be described hereinbelow. FIG. 5 is a block diagram showing one embodiment of an NC electric-discharge machine to which the method for controlling the withdrawal according to the present invention is applied. In Figures, the reference numeral 1 denotes an electrode of the NC electric-discharge machine, 2 a workpiece and 3 an XY cross table. The electrode 1 and workpiece 2 are opposite to each other with a predetermined gap (spark gap) between them, and the workpiece 2 is mounted on the XY cross table. The reference numeral 4 indicate an X-axial feed motor and 5 a Y-axial feed motor. These motors are intended for use to drive the XY cross table 3 X- and Y-axially. The reference numeral 6 denotes a Z-axial feed motor to drive the electrode 1 in the Z-axial direction. The reference numeral 7 indicates an NC (=numerical control) tap in which a control information 21 including positioning commands supplied for each block. The reference numeral 8 denotes a keyboard from which the control information 21 is supplied through key-input operation to an NC unit which will be described below.

The reference numeral 9 indicates an NC unit comprising a calulation controller 9A, an input interface 9B for acceptance at the calculation controller 9A of a control signal 22 from the keyboard 8, a tape reader 9C which reads the control information 21 recorded in the NC tape 7 and supplies it to the calculation controller 9A, a main memory 9D to store the basic program for numerical control (=NC), a withdrawal route memory 9E, an interpolation controller 9F and an output interface 9G which supplies to a power unit 10 electrical parameters 23 supplied from the calculation controller 9A and which are used for machining the workpiece.

The above-mentioned calculation controller 9A comprises a command analyzing unit 9A1, a minimum withdrawal route processing unit 9A2 and a forward/backward controller 9A3. Among these components of the calculation controller 9A serves to analyze the control information 21 and/or 22 from the keyboard 8 and/or the tape reader 9C and supplies the electrical parameters 23 included in the control information 21 to the power unit 10 while supplying a positioning command 24 in the control information to the minimum withdrawal route memory 9A2. Receiving the positioning command, the minimum withdrawal route memory 9A2 will analyze the minimum withdrawal route while supplying the command to the forward/backward controller 9A3. Namely, after receiving the positioning command 24 before a real machining is started and supplied with a withdrawal command from an inter-pole abnormality detector which will be described later, the minimum withdrawal route processing unit 9A2 will determine, for the withdrawal of the electrode 1 from the position where it is at that time, a shortest a minimum withdrawal route concerning at least one of the route distance and time required for the withdrawal and supplies it to the withdrawal route memory 9E. According to this embodiment, the minimum withdrawal route processing unit 9A2 receives the above-mentioned positioning command 24 and supplies a forward position of the electrode 1 for a real machining as well to the withdrawal route memory 9E. When no withdrawal command is supplied from the inter-pole abnormality detector, the forward/backward controller 9A3 supplies the interpolation controller 9F with a latest forward positioning command 25 stored in the withdrawal route memory 9E. When a withdrawal command is given, the forward/backward controller 9A3 will supply a backward positioning command 26 from the withdrawal route memory 9E to the interpolation controller 9F which in turn will drive the X-, Y- and X-axial feed motors 4 to 6 under a positioning command 27 (forward positioning command 25 or backward positioning command 26) received from the withdrawal route memory 9E to move the electrode 1 and the XY cross table 3 to the given position, thereby controlling the movement of the electrode 1 according to the positioning command 24 (forward positioning command 25) or backward positioning command 26 included in the control information 21. It should be noted that the movement of the electrode 1 and XY cross table 3 in relation to each other will also be called "movement of the electrode 1" for the convenience of the illustration and description.

The reference numeral 11 indicates an inter-pole abnormality detector which will deliver a withdrawal command 28 when any abnormality takes place between the poles (electrode and workpiece). This abnormality detector 11 is a voltage detector which detects a voltage between the poles, and delivers a withdrawal command 28 to the forward/backward controller 9A3 when the voltage is equal to or lower than a predetermined value. It continuously delivers the withdrawal commands to the controller 9A3 from the voltage detection until the voltage exceeds the predetermined value. Typically, when an inter-pole short-circuit occurs (the inter-pole voltage is 0 V), the inter-pole voltage will be below the predetermined value (the Inventor et al's experiments have proved that when the interpole voltage becomes about 40% of the no-load voltage, a discharge such as arcing or the like which will not be contributed to the electric-discharge machining is likely to take place; therefore, the above-mentioned "predetermined value" is about 40 V in case the no-load voltage is 100 V).

It should be noted that the power unit 10 applies between the electrode 1 and workpiece 2 a pulsed voltage corresponding to the working electrical parameters 23 supplied via the output interface 9G from the command analyzing unit 9A1, thereby generating pulsed discharge between the poles.

Next, referring to FIGS. 1, 3, 6 to 12 together, one embodiment of the method for controlling the withdrawal of electrode in NC electric-discharge machine, according to the present invention, will be described.

Figure 1:
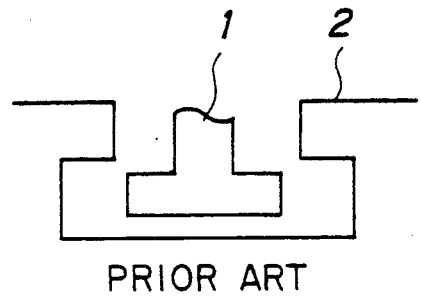
FIGS. 1 and 3 are schematic views, respectively, showing the geometrical relation between the electrode and workpiece in different manners of electric-discharge machining.
Figure 2:
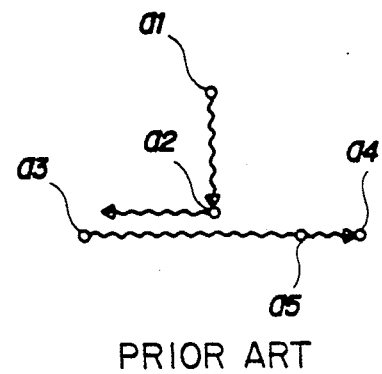
FIG. 2 shows the route of forwarding and withdrawing the electrode in relation to the workpiece in the example prior-art electric-discharge machining shown in FIG. 1.
Figure 6:
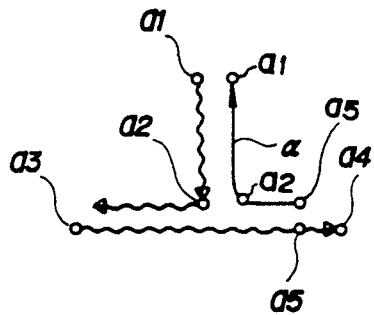
FIG. 6 shows a shortest (in distance) route of electrode withdrawal according to the present invention when a withdrawal command is issued when the electrode is in the mid of a forwarding route in an electric-discharge machining as shown in FIG. 2.

First, assume for machining the workpiece 2 into the form shown in FIG. 1 using the electrode 1 having the shape as shown in FIG. 1 that the forward positions 24 included in the control information 21 recorded in the NC tape 7 are the points a1, a2, a3 and a4 as shown in FIG. 6 and also that the aforementioned withdrawal command 28 is received when the electrode 1 is at the point a5 just short of the point a4. Under the assumption that the point a1 in FIG. 6 is the start point of the intended machining, the electrode 1 starts a machining at the point a1 and falls along the Z-axis. As the XY cross table 3 moves, the electrode 1 will move from the point a2 in the direction of negative (−) position along the X-axis and then from the point a3 in the direction of positive (+) position along the X-axis. At the point a5 just before the point a4 in the mid way to the point a4, the withdrawal command 28 is received. In this example, since the real working point has reached a position to the right of the point a2, the electrode 1 has not to return to the end in the negative direction along the X-axis (point a3) and should be withdrawn along the route indicated with the arrow α, which will minimize the route distance and required time of the withdrawal. According to the present invention, the electrode 1 is withdrawn along this route indicated with the arrow α.

Figure 3:
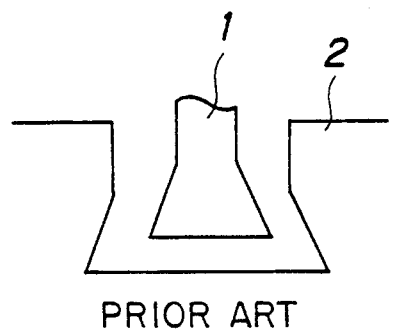
Figure 4:
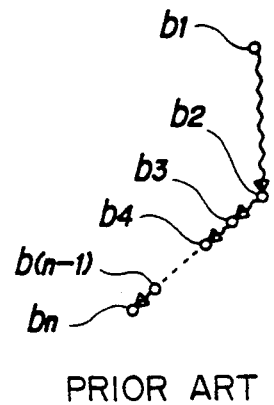
FIG. 4 shows the electrode forwarding and withdrawing route in the example prior-art electric-discharge machining shown in FIG. 3.
Figure 7:
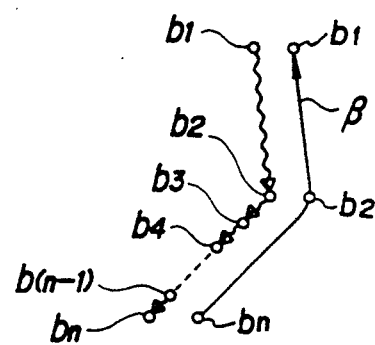
FIG. 7 shows a shortest (in time) route of electrode withdrawal according to the present invention when a withdrawal command is issued when the electrode is in the mid of a forwarding route in an electric-discharge machining as shown in FIG. 4.

Next, for machining the workpiece 2 into the shape shown in FIG. 3 using the electrode 1 having the form shown in FIG. 3, it is assumed that the electrode 1 is forwarded along a route from the point b2 through the points b3, b4, . . . , b(n−1) to the point bn as shown in FIG. 7 for the surface roughness of the workpiece 2 to be small. Namely, the electrode forwarding route has many small segements of a same direction, especially, in the section from the point b2 to bn. Also it is assumed that the withdrawal command 28 is received at the point bn and that the point b1 in FIG. 7 is the start point in this machining. First in this example, the electrode 1 falls from the point b1 along the Z-axis. While the XY cross table 3 is moves, the electrode 1 goes from the point b2 along many small segments of a same direction between b2 and b3, b3 and b4, . . . , b(n−1) and bn in succession especially in the section from the point b2 to the point bn at the lower left in the illustration, and the withdrawal command 28 is received when the electrode 1 is working at the point bn. In this example, the electrode 1 is to be withdrawn along the route being a single segment containing the points bn to b2 as indicated with the arrow β if the individual small segments are not taken in consideration. This route allows for a withdrawal of the electrode taking the possible minimum time. According to the present invention, the electrode 1 is withdrawn along the route indicated with the arrow β (passing from the point bn through the point b2 to the point b1).

As seen from the foregoing, the electrode 1 is withdrawn to a forward position preceding at least two blocks from the present position in relation to the workpiece 2 according to the withdrawal command 28 from the inter-pole abnormality detector 11. Note here that the "forward position preceding at least two blocks from the present position" falls on the forward position a2 in the example shown in FIG. 6 and the forward position b2 in the example shown in FIG. 7.

According to the present invention, when the withdrawal command 28 is still issued from the inter-pole abnormality detector 11 even if the electrode 1 has been linearly withdrawn to a forward position preceding more than two blocks from the position where it were, the electrode 1 is further withdrawn linearly to another forward position preceding at least two blocks from the position to which the electrode 1 has been once withdrawn. Finally, the withdrawal of the electrode 1 will be repeated to a forward position at which the withdrawal command 28 is not issued any longer from the inter-pole abnormality detector 11.

The control over the electrode withdrawal according to the aforementioned two embodiments of the present invention will be described in further detail with reference to FIGS. 8 to 12.

Figures 8, 9, 12:
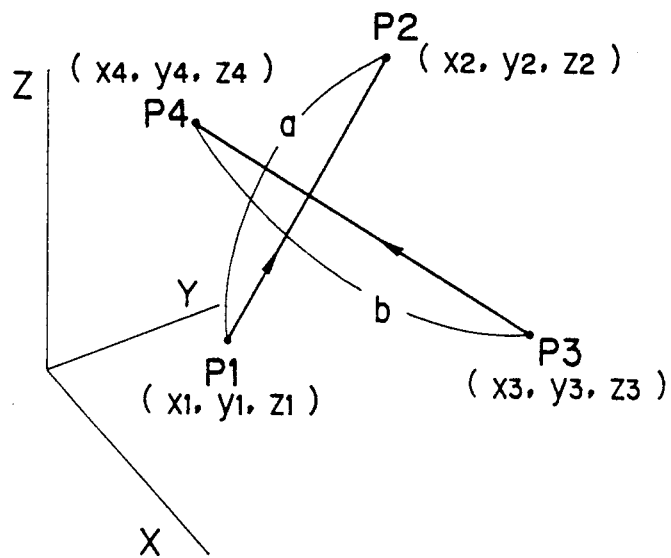
FIG. 8 shows forward and backward positions table which are stored in the withdrawal route memory, used in the method for controlling the withdrawal of electrode according to the present invention as shown by way of example in FIG. 6.
FIG. 9 shows forward and backward positions table which are stored in the withdrawal route memory, used in the method for controlling the withdrawal of electrode according to the present invention as shown by way of example in FIG. 7.
FIG. 12 is an explanatory drawing showing the method for judging whether or not there is a point of intersection between two segments in the X, Y and Z coordinate system and the two segments are of a same direction.

FIG. 8 shows tables of forward position FWD(T) to be stored in the aforementioned withdrawal route memory 9E in the electrode-withdrawal control according to the present invention, as illustrated in FIG. 6, and backward position BCK(T) when the withdrawal command 28 is issued in the course of a machining toward the forward position.

FIG. 9 shows tables of forward position FWD(T) to be stored in the aforementioned withdrawal route memory 9E in the electrode-withdrawal control according to the present invention, as illustrated in FIG. 7, and backward position BCK(T) when the withdrawal command 28 is issued in the course of a machining toward the forward position.

Figure 10:
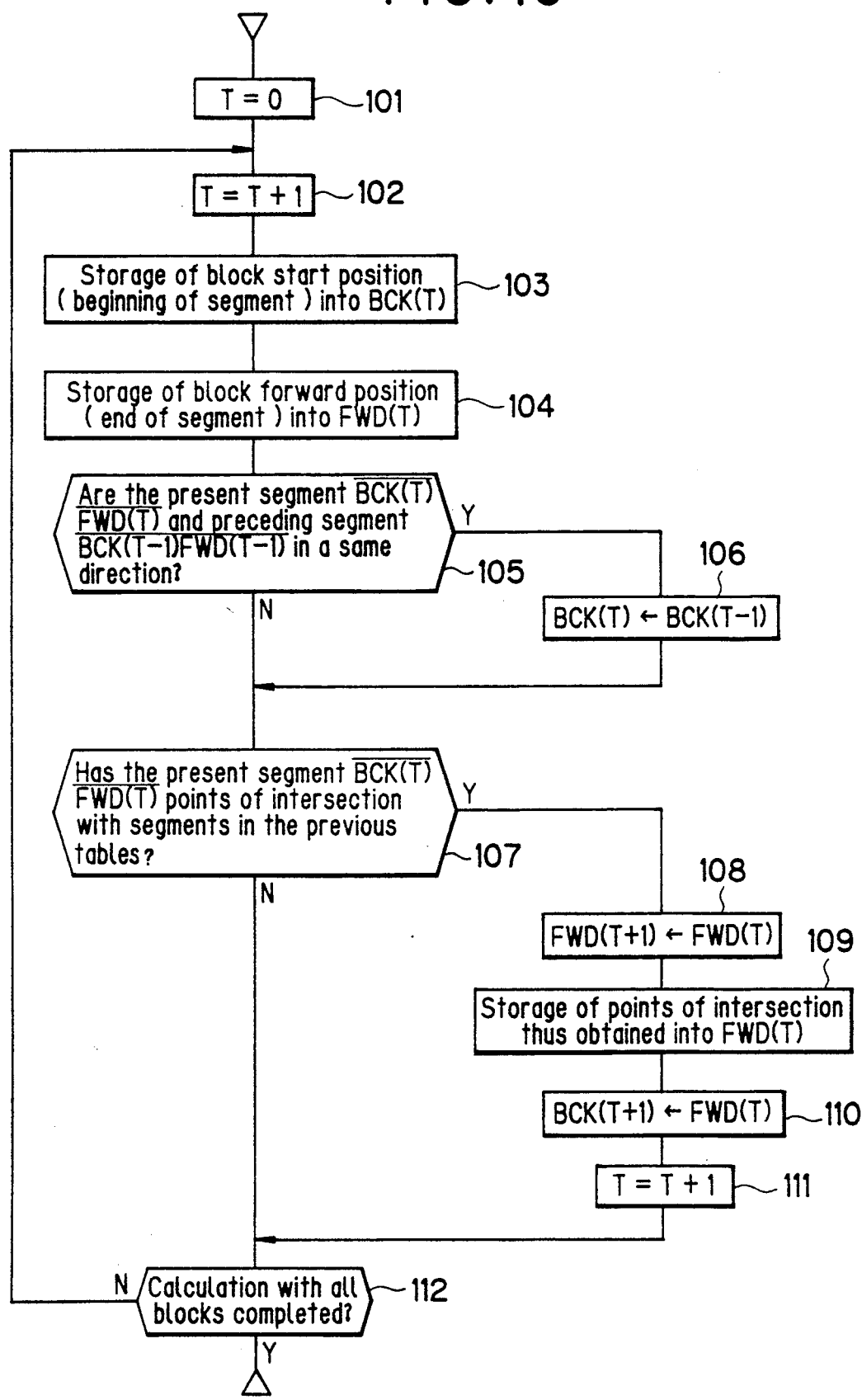
FIG. 10 is a flow chart showing one example of the storage of electrode positions into the withdrawal route memory (tabulation of electrode positions) in the methods for controlling the withdrawal of electrode according to the present invention as shown by way of example in FIGS. 6 and 7.

FIG. 10 is a flow chart showing one example of the storage (tabulation) of the above-mentioned positions into the withdrawal route memory 9E in the electrode-withdrawal control in the examples shown in FIGS. 6 and 7, according to the present invention.

Figure 11:
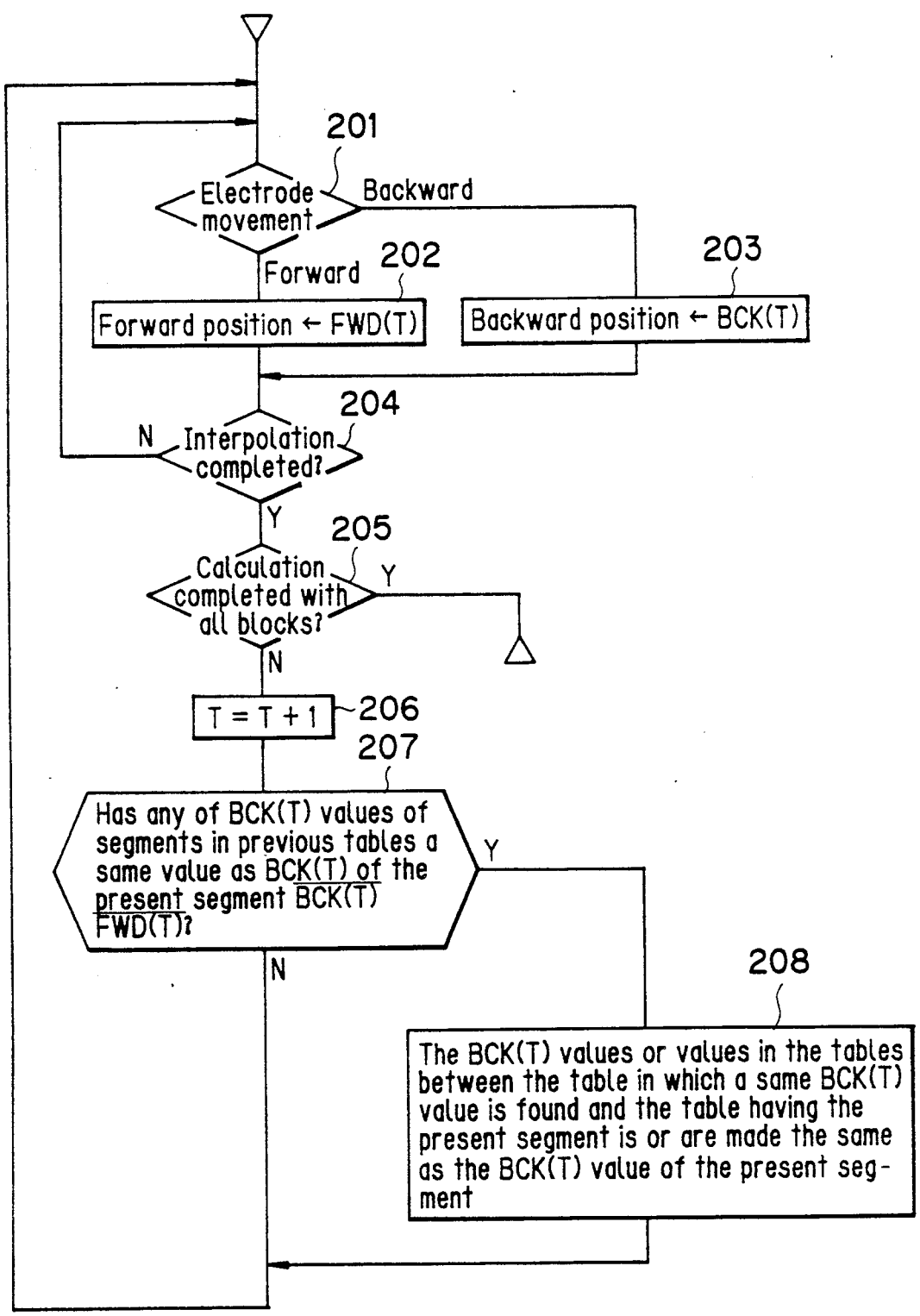
FIG. 11 is a flow chart showing one example of the table rewrite in a real electric-discharge machining with the method for controlling the electrode withdrawal according to the present invention in the example shown in FIG. 6.

FIG. 11 is a flow chart showing one example of the table rewrite in a real machining in the electrode-withdrawal control in the example shown in FIG. 6, according to the present invention.

First, the example shown in FIG. 6 will be explained with reference to FIGS. 8, 10 and 11.

The positioning commands 24 (positioning commands 24 for the forward positions a1 to a4) in the control information 21 recorded in the NC tape 7 are delivered from the command analyzing unit 9A1 and supplied to the minimum withdrawal route processing unit 9A2 which in turn will produce in the withdrawal route memory 9E the tables indicative of withdrawal route (also indicative of forward positions (forwarding route)) according to the flow chart shown in FIG. 10.

Namely, the minimum withdrawal route processing unit 9A2 proceeds to the tabulation as in FIG. 8 under the execution start command in the aforementioned control information 21. First the minimum withdrawal route processing unit 9A2 clears to zero the count T in a table counter provided thereon (at step 101), and adds one (T+1) which provides a table No. 1 (at step 102). Next, the present position a1 being the machining start forward position is stored into the backward position column BCK(1) in the table No. 1 as the first block start position (beginning of the segment $\overline{BCK(1)\ FWD(1)}$ of the control information 21 under the aforementioned execution start command (at step 103). The forward position of the first block (end of the segment $\overline{BCK(1)\ FWD(1)}$ is stored into the forward position column FWD(1) of the table No. 1 (at step 104).

Since the position data (FWD(1), BCK(1)) stored in the columns of the table No. 1 do not meet the requirements at the steps 105, 107 and 112, the processing procedure returns to a step just before the step 102. Therefore, for the processing of the second block in the control information 21, FWD(2)=a3 and BCK(2)=a2 shown in the table No. 2 are stored by the same processings as above (steps 102 to 104).

Since the position data (FWD(1), BCK(1); FWD(2), BCK(2)) stored in the columns of the table Nos. 1 and 2 do not meet the requirements at steps 105, 107 and 112, the processing procedure returns to a step just before the step 102. Therefore, for the processing of the third block in the control information 21, FWD(3)=a4 and BCK(3)=a3 shown in the table No. 3 are stored by the same processings as above (at steps 102 to 104).

Since the position data (FWD(1), BCK(1) to FWD(3), BCK(3)) stored in the columns of the tables Nos. 1 to 3 do not meet the requirements at step 105, the processing goes to step 107. At this step 107, it is judged whether a point of intersection with the previous segments exists on the segment $\overline{BCK(3)\ FWD(3)}$ (between a3 to a4). If a point of intersection a2 (BCK(2)) is found as the result of this judgment, BCK(2) is generated as a point of division for dividing the segment $\overline{BCK(3)\ FWD(3)}$ into two segments. The value (position) of FWD(3) is stored at FWD(4) (at step 108, and FWD(3) is written and the abovementioned point of division BCK(2) is stored at FWD(3) as shown with *1 in FIG. 8 (at step 109).

At the same time, the point a3 is stored at BCK(3) and the point a2 is at BCK(4) since BCK(3) and BCK(4) are the beginnings of the segements $\overline{BCK(3)\ FWD(3)}$ and $\overline{BCK(4)\ FWD(4)}$, namely, the forward positions of the previous segment, respectively (at step 109). As an extra one table No. has been set at steps 108 and 109, one is added to the table No. (at step 111).

The minimum withdrawal route processing unit 9A2 repeats the above-mentioned processings each time each block in the control information 21 is read and given as forward position 24, thereby generating a table of forward position FWD(T) and backward position BCK(T) in the withdrawal route memory 9E.

If no point of intersection with the previous segments is found at step 107, the processing at step 102 is passed via step 112, and subsequently the above-mentioned processings are repeatedly done until they are completed with all the blocks (segments) in the control information 21 (at step 112).

It should be noted that the above-mentioned processings should preferably be done for several blocks before a real machining, but the real machining can be done after all these processings are completed.

Next, for a real machining, the processings are done according to the flow chart shown in FIG. 11. First, it is judged whether the current state of operation is a forwarding (normal machining) or a withdrawal, namely, whether or not a withdrawal command 28 is issued from the inter-pole abnormality detector 11 (at step 201). If the state of operation is a forwarding, FWD(T) in the aforementioned table is read as forward position (at step 202). When the state of operation is a withdrawal, BCK(T) in the same table is read as backward position (at step 203) and an interpolation is made for each segment with that position. When an interpolation for one segment is completed (at step 204), an interpolation for a next segment will be instructed (at steps 205 and 206). At this time, it is judged whether any of BCK(T) values (position) of segments in previous tables is the same as the BCK(T) value (position) of the present segment (at step 207). If there is found a segment having the same value as the result of the judgement, the BCK(T) value (position) in the tables between the table in which a same BCK(T) value is found and the table having the present segment is made the same as the BCK(T) value (backward position), a2 here, of the present segment and stored (at step 208). Thereby, the withdrawal route when a withdrawal command 28 is issued while a machining is being made at the point a5 extends from a5 through a2 to a1. This route is the possible shortest withdrawal route. Also, with BCK(2) to BCK(4) between which points of a same value exist in succession, the time for generation of interpolation data for controlling the interpolation of backward positions between these points can be saved in the NC unit 9 as well, thus the electrode 1 can be withdrawn in a short time.

At step 207, in case there is not found any segment having the same BCK(T) value (position) as the BCK(T) value of the present segment, the processing goes back to step 201, and the above-mentioned processings are repeated until they are completed with all the blocks (segments) in the control information 21, namely, until the machining is complete (at step 205).

Next, the present invention will be further described concerning the example shown in FIG. 7 (machining along successive small segments) with reference to FIGS. 9 and 10.

In this example, the steps 101 to 104 for the tabulation as in FIG. 10 are the same as in the above-mentioned example in FIG. 6, and these processings will provide table Nos. 1 to 3 as in FIG. 9. Namely, for the first segment $\overline{BCK(1)\ FWD(1)}$ (in table No. 1), the backward position b1 is stored at BCK(1) (at step 103) and the forward position b2 is stored at FWD(1) (at step 104). Similarly for a next segment $\overline{BCK(2)\ FWD(2)}$ (in table No. 2), the backward position b2 is stored at BCK(2) and the forward position b3 is at FWD(2). Further, for a further segment $\overline{BCK(3)\ FWD(3)}$ (in table No. 3), the backward position b3 is stored at BCK(3) and the forward position b4 is at FWD(3).

At a next step 105, the segment $\overline{BCK(T-1)\ FWD(T-1)}$ is checked to see that it is of a same direction as the segment $\overline{BCK(T)\ FWD(T)}$. If these two segments are of a same direction, the value (position) b3 of BCK(T) is made the same as the value (position) b2 of BCK(2) and stored (as indicated with *3 in FIG. 10).

After the processings to be done here and the processings shown in FIG. 10 are done with all the segments, namely, all the blocks in the control information 21 (at step 112), the withdrawal route when the withdrawal command 28 is issued during a machining at the point bn will extend from bn through b2, b2, . . . to b2. In other words, the electrode 1 is withdrawn through the positions of a same value. Hence, for BCK(n−1) to BCK(2) between which the same backward positions exists in succession, the interpolation data for the interpolation control of backward position between these points can be generated in the NC unit 9 faster and the electrode 1 can be withdrawn faster accordingly.

In the example in FIG. 7, no table rewrite is done in any real machining, which is different from the sample shown in FIG. 6, and so the tabulation is complete with the processing steps shown in the flow chart in FIG. 10.

Note that the aforementioned processings should preferably be done several blocks prior to a real machining, but the real machining may be done after all the processings are over, which is similar to the example in FIG. 6.

How to judge, by calculation, whether a point of intersection between the segments (for example, the points a2 in the example shown in FIG. 6) exists or not (at step 107 in FIG. 10) and whether or not both the segments before and after a segment in consideration at step 105 in FIG. 10 are of a same direction (for example, the directions from bn to b2 in the example in FIG. 7 are the same as each other or not) will be discribed herebelow with reference to FIG. 12. In FIG. 12, x1 to x4, y1 to y4 and z1 to z4 are coordinate values (known) preprogrammed as control information 21, a is the length of the segment $\overline{P1\ P2}$, and b is the length of the segment $\overline{P3\ P4}$.

The segment $\overline{P1\ P2}$ can be expressed as follows based on the vector method:

$$\left.\begin{array}{l} X = x1 + a(x2 - x1) \\ Y = y1 + a(y2 - y1) \\ Z = z1 + a(z2 - z1) \end{array}\right\} \quad (1)$$

Also, the segment $\overline{P3\ P4}$ can be expressed similarly as follows:

$$\left.\begin{array}{l} X = x3 + b(x4 - x3) \\ Y = y3 + b(y4 - y3) \\ Z = z3 + b(z4 - z3) \end{array}\right\} \quad (2)$$

For a point of intersection between the above two segments $\overline{P1\ P2}$ and $\overline{P3\ P4}$ to exist in the example in FIG. 6, the left sides of the expressions (1) and (2) are to be the same as each other, namely, the following relation is to be established:

$$\left.\begin{array}{l} x1 + a(x2 - x1) = x3 + b(x4 - x3) \\ y1 + a(y2 - y1) = y3 + b(y4 - y3) \\ z1 + a(z2 - z1) = z3 + b(z4 - z3) \end{array}\right\} \quad (3)$$

Since x1 to x4, y1 to y4 and z1 to z4 in the expression (3) are data already defined, the unknown are two in number, a and b and the equations are three in number. Therefore, the terms a and b are determined using the two of the abovementioned three equations, and their values are placed in the remaining one equation. If they fit the equation, a point of intersection exists. If not, there is no point of intersection. Further, using the terms a and b meeting the abovementioned three equations, the coordinates X, Y and Z of the point of intersection can easily be obtained.

Next, it is judged in the example in FIG. 7 whether or not both the segments before and after a segment in consideration are of a same direction. This judgement can be done by making sure that the following relation is established, since the segments will be of a same direction if it is confirmed through the equations (1) and (2) above that the component ratios X, Y and Z are equal to each other:

$$(x4 - x3)/(x2 - x1) = (y4 - y3)/(y2 - y1) = \quad (4)$$

$$(z4 - z3)/(z2 - z1)$$

The aforementioned embodiment has been described concerning a case that a withdrawal command 28 is automatically given to the NC unit 9 when an inter-pole abnormality such as inter-pole short-circuit takes place, but the present invention is not limited to this case. For example, (1) since the electrode 1 is withdrawn at every lapse of a predetermined time whether an inter-pole short-circuit concurrently occurs due to metal particles staying in the spark gap or there is a possibility of such short-circuit, the NC unit 9 may be automatically supplied with a withdrawal command 28 at predetermined intervals by manually supplying the command to the NC unit 9 through operation of the keyboard 8 or by including the command into the control information 21 to the NC unit 9 the control information 21. Also (2) when desired in the course of a machining, the withdrawal command 28 may be manually supplied to the NC unit 9 through operation of the keyboard 8. By the method (1) above, it is possible to ensure a satisfactory prevention of such inter-pole short-circuit, and owing to the method (2), it is possible to withdraw the electrode 1 freely for some reason such as interruption of a machining being done. In any case, the electrode can be withdrawn with a high efficiency.

According to the above-mentioned embodiments, tables indicative not only of the withdrawal route but of forward positions (forwarding route) are generated in the withdrawal route memory 9E which will supply both the forward and backward positioning commands 27 to the forward/backward controller 9A3, but only tables indicative of a withdrawal route may be generated in the withdrawal route memory 9E. In case tables indicative of both withdrawal route and forward positions (forwarding route) are generated in the withdrawal route memory 9E, the command line from the minimum withdrawal route processing unit 9A2 to the forward/backward controller 9A3 is used as a line over which a withdrawal command is supplied manually from, for example, the keyboard to the NC unit 9.

Furthermore in the aforementioned embodiments, the control over the movement along the Z-axis is done by moving the electrode 1, but it may be done by moving the XY cross table.

As having been described in the foregoing, the present invention makes it possible that after the NC unit 9 is supplied with a withdrawal command 28, the electrode 1 is linearly withdrawn to a forward position processing at least two blocks the present position in relation to the workpiece according to the withdrawal command 28. Thus, the electrode 1 can be withdrawn with a high efficiency, whereby the metal particles resulted from the electric-discharge machining can be removed from the spark gap with a high efficiency.

What is claimed is:

1. A method for controlling the withdrawal of an electrode in an NC electric-discharge machine wherein when a NC unit receives a withdrawal command while a workpiece is being machined with electric discharges made between said electrode and said workpiece with the former being forwarded in relation to the latter according to a control information including positioning commands given to said NC unit for each block, said electrode is caused to be withdrawn linearly to a forward position preceding at least two blocks the present forward position from the workpiece according to said withdrawal command, said withdrawal command being provided from an inter-pole abnormality detector while an inter-pole abnormality having taken place between the electrode and workpiece is lasting, said forward position preceding at least two blocks the present forward position is a nearest one of the points of intersection between segments connecting mutually one forward position and a next one.

2. A method for controlling the withdrawal of an electrode in an NC electric-discharge machine wherein when a NC unit receives a withdrawal command while a workpiece is being machined with electric discharges made between said electrode and said workpiece with the former being forwarded in relation to the latter according to a control information including positioning commands given to said NC unit for each block, said electrode is caused to be withdrawn linearly to a forward position preceding at least two blocks the present forward position from the workpiece according to said withdrawal command, said withdrawal command being provided from a keyboard connected to said NC unit and which is operated when desired for an electrode withdrawal, said forward position preceding at least two blocks the present forward position is a nearest one of the points of intersection between segments connecting mutually one forward position and a next one.

3. A method for controlling the withdrawal of an electrode in an NC electric-discharge machine wherein when a NC unit receives a withdrawal command while a workpiece is being machined with electric discharges made between said electrode and said workpiece with the former being forwarded in relation to the latter according to a control information including positioning commands given to said NC unit for each block, said electrode is caused to be withdrawn linearly to a forward position preceding at least two blocks the present forward position from the workpiece according to said withdrawal command, said withdrawal command being provided from a keyboard connected to said NC unit and which is operated for an electrode withdrawal to be made upon each lapse of a predetermined time, said forward position preceding at least two blocks the present forward position is a nearest one of the points of intersection between segments connecting mutually one forward position and a next one.

4. A method for controlling the withdrawal of an electrode in an NC electric-discharge machine wherein when a NC unit receives a withdrawal command while a workpiece is being machined with electric discharges made between said electrode and said workpiece with the former being forwarded in relation to the latter according to a control information including positioning commands given to said NC unit for each block, said electrode is caused to be withdrawn linearly to a forward position preceding at least two blocks the present forward position from the workpiece according to said withdrawal command, said withdrawal command being included in said control information and intended for an electrode withdrawal to be made upon each lapse of a predetermined time, said forward position preceding at least two blocks the present forward position is a nearest one of the points of intersection between segments connecting mutually one forward position and a next one.

* * * * *